United States Patent [19]

Hart et al.

[11] 3,740,590

[45] June 19, 1973

[54] LATCH CIRCUIT

[75] Inventors: Robert L. Hart, Longmont, Colo.; Joel C. Leininger, Pleasant Valley, N.Y.

[73] Assignee: International Business Machines Corporation, Armonk, N.Y.

[22] Filed: Dec. 17, 1971

[21] Appl. No.: 209,332

[52] U.S. Cl................... 307/289, 307/208, 307/218

[51] Int. Cl....................... H03k 3/286, H03k 19/22

[58] Field of Search ................. 307/208, 218, 289, 307/290, 291

[56] References Cited

UNITED STATES PATENTS

| | | | |
|---|---|---|---|
| 3,385,980 | 5/1968 | Geller | 307/208 X |
| 3,339,145 | 8/1967 | MacSorley | 307/218 X |

*Primary Examiner*—John Zazworsky

*Attorney*—Kenneth R. Stevens, Alvin J. Riddles and J. Jancin, Jr.

[57] ABSTRACT

A latch circuit in which false output and skewing of binary output signals on the latch output terminal are eliminated comprising conventional set and hold-clear logic sections. The improvement comprising logic means having an input terminal adapted for connection to the set signals and an output terminal connected to the output latch terminal and being responsive to the set signals for maintaining the state of the latch output terminal during a clock signal transition, and means for simultaneously applying binary clock signals of a first state to the set section and binary clock signals of opposite state to the hold-clear sections so as to allow one or the other to be activated.

6 Claims, 5 Drawing Figures

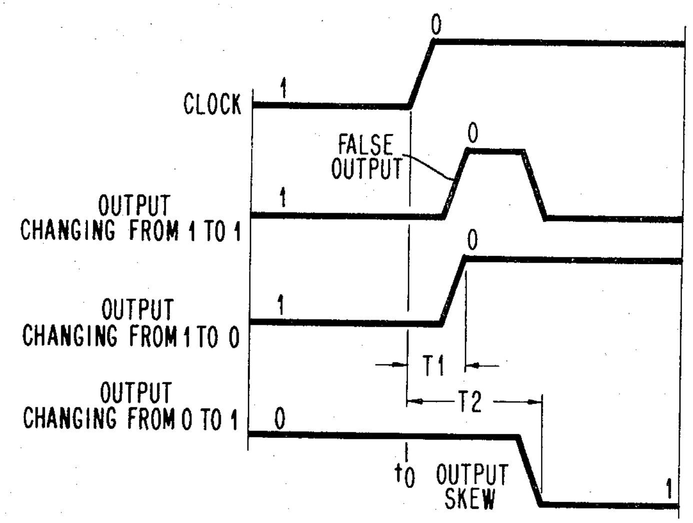
FIG. 2
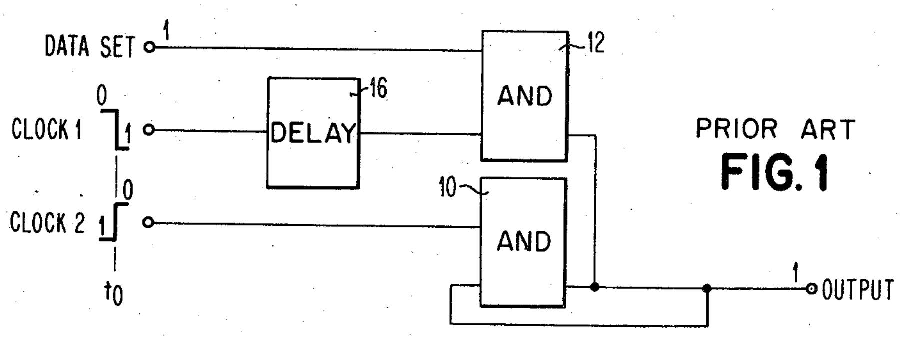
PRIOR ART FIG. 1
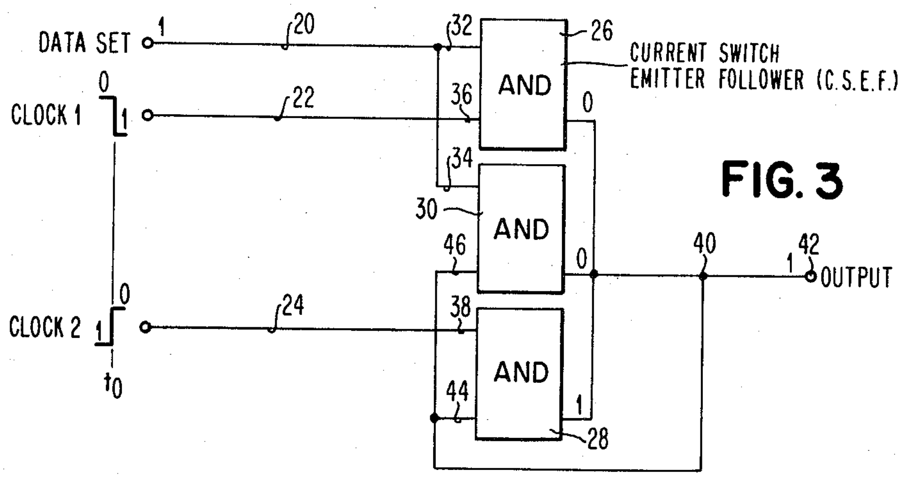
FIG. 3
FIG. 3B
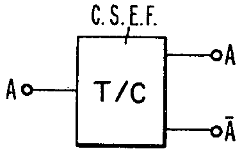
FIG. 3A
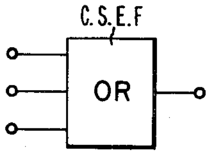

LATCH CIRCUIT

BACKGROUND OF THE INVENTION

1. Field of the Invention

This invention relates to circuits and more particularly to a latch circuit.

2. Brief Description of the Prior Art

In conventional well known latch circuits, there exists the problem of false output signals and skewing as illustrated by the waveforms in FIG. 2 and the prior art latch circuit of FIG. 1.

Firstly, as to the false output problem, it can be seen that if a clock pulse going from a 1 to a 0 state is applied at time *t*0 to a hold-clear AND gate 10 with the output terminal of the latch already in a binary 1 state, and simultaneously therewith, a binary 1 is applied on the data set line to the set AND gate 12, then the clock signal disables AND gate 10 and momentarily a binary 0 false output is generated on the latch output terminal. Of course, after a given delay provided by delay means 16, the clock 1 pulse residing in a binary 1 state in combination with the binary 1 applied by the data set terminal produces a 1 output from the set terminal 12 and the latch output terminal is returned to the correct or binary 1 state. In other words, in prior art latch circuits, a given binary state clock pulse is first fed to disable the hold-clear section, and then a clock pulse of opposite state is delayed and fed to the set section in order to set the output terminal to the desired binary state in accordance with the binary data being applied to the data set line. This inherent delay is necessary in order to insure that both the set and the hold-clear logic blocks do not operate simultaneously and thus create an erroneous race condition between the two logic elements.

Additionally, a latch circuit of this type possesses another inherent disadvantage in that a skewing problem exists between the time period necessary to change the output of a latch from a 1 to a 0 state and the time period necessary to change the latch output terminal from a 0 to a 1 state. This is illustrated in the lower two waveforms of FIG. 2, measuring from time *t*0 or when the clock pulse is first activated, by a time period of T1 necessary to change the output terminal from a binary 1 to a binary 0 state and a time period T2 necessary to change the output terminal from a binary 0 state to a binary 1 state.

In the past, the problems of false output and skewing are solved by providing a settling time in the overall system to which the latch circuits are connected. That is, any circuits which are connected to the latch output terminal do not become receptive to latch output signal changes until a given time period which exceeds that which is necessary in order to allow the false output signal to disappear, and also a time period which is at least as great or greater than time T2 so as to handle the skewing problem. Although known prior art classic techniques exist for solving the false output problem per se, no known prior art latch circuit is known which solves both the skewing and false output situations.

SUMMARY OF THE INVENTION

Therefore, it is an object of the present invention to provide a latch circuit which eliminates the false output and skewing problems.

Another object of the present invention is to provide a latch circuit which eliminates the false output and skewing problem and thus allows for much higher performance circuits capable of operating at significantly increased speeds.

In accordance with the above aforementioned objects, the present invention provides a latch circuit which in addition to the standard set logic section and the hold-clear logic sections further comprises means for simultaneously applying clock signals of a first state to the set section and binary signals of opposite state to the hold-clear section, so as to allow one or the other to be activated, and additional logic means also responsive to the set signals for maintaining the state of the latch output terminal during clock signal transitions from one binary state to another.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 1 is a schematic representation of a prior art latch circuit which taken in conjunction with associated waveforms of FIG. 2 illustrates the false output and skewing problems.

FIG. 3 is an electrical schematic representation of a preferred embodiment of the present invention, and FIGS. 3A and 3B illustrate variations which can be made to the basic circuit depending on the particular logic family being employed, that is, current switch emitter-follower, voltage mode logic, etc.

DESCRIPTION OF THE PREFERRED EMBODIMENT

Now referring to FIG. 3, it schematically represents the improved latch circuit of the present invention and comprises data set line 20, a clock 1 line 22, and a clock 2 line 24. The logic section comprises a set logic section comprising an AND gate 26, a hold-clear logic section 28, and an additional logic override means comprising AND gate 30. The data set line 20 is connected to the AND gates 26 and 30 via terminals 32 and 34, respectively. The clock 1 line 22 is connected to another input terminal of the AND gate 26 at 36, and the clock 2 line is connected as an input to the AND gate 28 at terminal 38. Each of the output terminals from the respective AND gates are wire OR'd together at an output node 40, which in turn is connected to the latch output terminal 42. A feedback connection from the output node 40 also connects input terminals 44 and 46 of AND gates 28 and 30, respectively.

Although not specifically shown for purposes of simplicity, it is clear that an external reset line can be supplied to the AND gates 28 and 30, in a well known manner.

The principle of the present invention is generally applicable to any family of logic circuits. For example, the AND blocks can be implemented by current switch emitter-follower logic, which allows collector dot OR'ing as is illustrated in U.S. Pat. No. 3,505,535, Cavaliere, issued Apr. 7, 1970, and assigned to the same assignee as the present invention. Thus, when implemented with current switch emitter-follower logic, direct wired OR techniques are available for connecting the output terminals from the respective AND gates 26, 28 and 30. However, if the present invention is implemented in a voltage mode type of logic circuit, then it is necessary to connect the output terminals of the plurality of AND gates to an OR circuit as illustrated in FIG. 3B, since direct wire OR'ing techniques are not available with this type of logic.

An important consideration in the present invention is the fact that the in-phase and out-of-phase, that is the binary clock signals of opposite state, be simultaneously applied to the logic sections designated at 26 and 28. Accordingly, when implementing the invention with current switch emitter-follower logic, a suitable means of generating the simultaneous clock 1 and clock 2 pulses comprise a true-complement or in-phase and out-of-phase current switch emitter-follower logic block, again as described in U. S. Pat. No. 3,505,535.

OPERATION

Thus, the present invention eliminates the false output and skewing problem primarily due to the fact that no delay occurs between the application of the clock 1 and clock 2 pulses to the set logic and the hold-clear logic blocks 26 and 28, respectively. As a result, the settling time delays which were necessarily built into the previous systems employing prior art latches are no longer required and much higher logic circuit speeds are obtainable. Moreover, the addition of logic element 30 which is responsive to the binary information on the data set line 20 during the simultaneous conditioning of gates 26 and 28 insures that the correct binary state is maintained on the output terminal 42 during this time period.

Assuming a binary 1 is to be written into the latch and the output terminal 42 is already in a binary 1 state, then the binary 1 on data set line 20 in conjunction with the binary 1 state of the clock 1 signal sets the output terminal to a binary 1 via the set block 26. Simultaneously therewith, the clock 2 signal on line 24 is operative to clear the output terminal of any previous information since line 38 momentarily disables AND gate 28.

During the enabling of AND gate 26 and the disabling of AND gate 28, the AND gate 30 insures that the output terminal 42 is maintained at the binary state in which the latch is being set, for those cases where the latch is going from a 1 to a 1 state. For example, with output terminal 42 in a binary 1 state, a binary 1 is also applied to input terminal 46 of AND gate 30. Thus, upon the application of a binary 1 to the data set line 20, the AND gate 30 is gated to maintain a binary 1 at the output terminal 42 during the conditioning of AND gates 26 and 28 in response to their respectively applied clock 1 and clock 2 signals.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. In a latch circuit having a single level of delay, a set section adapted to receive binary set signals and binary clock signals, and being responsive to the set signals and the clock signals for setting a latch output terminal to a binary state in accordance with the state of the set signals, and a hold-clear section having an input terminal connected to the latch output terminal and adapted to receive binary clock signals, the hold-clear section being responsive to the clock signals for clearing the latch output terminal of its binary state, and also being responsive to the binary state of the latch output terminal for holding the output terminal at the desired binary level after the termination of the binary set signals, the improvement comprising:

a. logic means having an input terminal adapted for connection to the set signals and an output terminal connected to said latch output terminal, b. said logic means being responsive to the set signals for maintaining the state of the latch output terminal during clock signal transitions from one binary state to another, and c. means for simultaneously applying to said set section binary clock signals of a first state and to said hold-clear section binary clock signals of a second state so as to allow one or the other to be activated, whereby false output in skewing of binary output signals on said latch output terminal is eliminated.

2. A latch circuit as in claim 1 wherein:

a. said set section, said hold-clear section, and said logic means comprise AND gates.

3. A latch circuit as in claim 2 wherein:

a. said AND gates comprise current switch emitter-follower logic.

4. A latch circuit as in claim 3 wherein:

a. said means for simultaneously applying clock signals of opposite state comprises a current switch emitter-follower true-complement generator.

5. A latch circuit as in claim 2 further including:

a. an OR circuit means for connecting the output terminals of each of said AND gates to the latch output terminal.

6. In a latch circuit, a set section adapted to receive binary set signals and first predetermined binary clock signals, and being responsive to the set signals and the first predetermined clock signals for setting a latch output terminal to a binary state in accordance with the state of the set signals, and a hold-clear section having an input terminal connected to the latch output terminal and adapted to receive second predetermined binary clock signals, the hold-clear section being responsive to the second predetermined clock signals for clearing the latch output terminal of its binary state, and also being responsive to the binary state of the latch output terminal for holding the output terminal at the desired binary level after the termination of the binary sections, the improvement comprising:

a. logic means having an input terminal adapted for connection to the set signals and an output terminal connected to said latch output terminal, said set section and said hold-clear section further comprising output terminals directly connected to said output terminal of said logic means, b. connecting means for simultaneously applying said first and said second predetermined clock signals to said set section and said hold-clear section, respectively, said first and second predetermined clock signals being complementary to each other, and c. said logic means being responsive to the set signals for maintaining the state of the output terminal during transitions from one binary state to another of said first and second predetermined clock signals.

* * * * *

PO-1050
(5/69)

UNITED STATES PATENT OFFICE
CERTIFICATE OF CORRECTION

Patent No. 3,740,590 Dated June 19, 1973

Inventor(s) Robert L. Hart and Joel C. Leininger

It is certified that error appears in the above-identified patent and that said Letters Patent are hereby corrected as shown below:

Column 4 Line 17 delete "in" and substitute -- and --

Column 4 Line 18 delete "is" and substitute -- are --

Signed and sealed this 5th day of March 1974.

(SEAL)
Attest:

EDWARD M.FLETCHER,JR.
Attesting Officer

C. MARSHALL DANN
Commissioner of Patents

53